US010908909B2

(12) United States Patent
Moudgill et al.

(10) Patent No.: US 10,908,909 B2
(45) Date of Patent: Feb. 2, 2021

(54) PROCESSOR WITH MODE SUPPORT

(71) Applicant: Optimum Semiconductor Technologies, Inc., Tarrytown, NY (US)

(72) Inventors: Mayan Moudgill, Chappaqua, NY (US); Gary Nacer, Morris Plains, NJ (US); C. John Glossner, Nashua, NH (US); Arthur Joseph Hoane, Yonkers, NY (US); Paul Hurtley, White Plains, NY (US); Murugappan Senthilvelan, Carmel, NY (US)

(73) Assignee: Optimum Semiconductor Technologies Inc., Tarrytown, NY (US)

(*) Notice: Subject to any disclaimer, the term of this patent is extended or adjusted under 35 U.S.C. 154(b) by 257 days.

(21) Appl. No.: 15/155,570

(22) Filed: May 16, 2016

(65) Prior Publication Data

US 2016/0364236 A1 Dec. 15, 2016

Related U.S. Application Data

(60) Provisional application No. 62/172,860, filed on Jun. 9, 2015.

(51) Int. Cl.
*G06F 9/30* (2018.01)
*G06F 9/38* (2018.01)
(Continued)

(52) U.S. Cl.
CPC ........ *G06F 9/30189* (2013.01); *G06F 9/3005* (2013.01); *G06F 9/30123* (2013.01);
(Continued)

(58) Field of Classification Search
CPC ........ G06F 9/30189; G06F 9/46; G06F 9/461; G06F 9/48; G06F 9/50; G06F 9/30123;
(Continued)

(56) References Cited

U.S. PATENT DOCUMENTS 5,684,948 A * 11/1997 Johnson ............... G06F 9/3863
710/260
2003/0033509 A1* 2/2003 Leibholz ............. G06F 9/3012
712/228
(Continued)

FOREIGN PATENT DOCUMENTS

EP 1027645 B1 9/2002
WO 2007017683 A1 2/2007

OTHER PUBLICATIONS

Freescale Semiconductor, "ERER: A Programmer's Reference Manual for Freescale Power Architecture Processors", June, pp. 1-10 to 1-11, 2-1 to 2-3, and 4-5 to 4-15 (Year: 2014).*
(Continued)

*Primary Examiner* — Aimee Li
*Assistant Examiner* — Courtney P Carmichael-Moody
(74) *Attorney, Agent, or Firm* — Zhong Law, LLC

(57) ABSTRACT

A computer processor may include a plurality of hardware threads. The computer processor may further include state processor logic for a state of a hardware thread. The state processor logic may include per thread logic that contains state that is replicated in each hardware thread of the plurality of hardware threads and common logic that is independent of each hardware thread of the plurality of hardware threads. The computer processor may further include single threaded mode logic to execute instructions in a single threaded mode from only one hardware thread of the plurality of hardware threads. The computer processor may further include second mode logic to execute instructions in a second mode from more than one hardware thread of the plurality of hardware threads simultaneously. The computer processor may further include switching mode logic to switch between the first mode and the second mode.

21 Claims, 5 Drawing Sheets

(51) Int. Cl.
*G06F 9/46* (2006.01)
*G06F 9/48* (2006.01)
*G06F 9/455* (2018.01)

(52) U.S. Cl.
CPC ........ *G06F 9/30145* (2013.01); *G06F 9/3851* (2013.01); *G06F 9/45541* (2013.01); *G06F 9/462* (2013.01); *G06F 9/48* (2013.01)

(58) Field of Classification Search
CPC .. G06F 9/3851; G06F 9/3012; G06F 9/30127; G06F 12/491; G06F 9/45533; G06F 9/45541; G06F 9/462; G06F 9/45558
USPC ........................................................ 718/108
See application file for complete search history.

(56) References Cited

U.S. PATENT DOCUMENTS

| | | | | |
|---|---|---|---|---|
| 2004/0215939 A1* | 10/2004 | Armstrong | .......... | G06F 9/30181 712/220 |
| 2006/0195683 A1* | 8/2006 | Kissell | ................ | G06F 9/30043 712/228 |
| 2008/0034190 A1 | 2/2008 | Rodgers et al. | | |
| 2008/0104296 A1* | 5/2008 | Blackmore | ........... | G06F 9/4812 710/267 |
| 2009/0144737 A1 | 6/2009 | Armstrong et al. | | |
| 2013/0326193 A1* | 12/2013 | McCarthy | ........... | G06F 9/30181 712/207 |
| 2014/0033304 A1 | 1/2014 | Lewis | | |
| 2014/0365753 A1 | 12/2014 | Hooker et al. | | |
| 2015/0301953 A1* | 10/2015 | Bybell | ................ | G06F 12/1045 711/207 |

OTHER PUBLICATIONS

"Embedded Multicore: An Introduction", July, Freescale Semiconductor, pp. 1-1 to 7-8 (Year: 2009).*
PCT Notification of Transmittal of the International Search Report and the Written Opinion of the International Searching Authority for PCT Application No. PCT/US16/32853, dated Aug. 16, 2016, 8 pages.
European Application No. 16808001.8, Extended European Search Report dated May 24, 2019, 11 page.

* cited by examiner

| HSC | | DEBUG | FPEN | IEN2 | | | | CACHE | TRANS | ITHID | NHYP |
|---|---|---|---|---|---|---|---|---|---|---|---|
| PSC | PROCID | DEBUG | FPEN | | IEN1 | IEN0 | | CACHE | TRANS | | USER |

FIG. 2

PROCESSOR WITH MODE SUPPORT

CROSS-REFERENCE TO RELATED APPLICATIONS

This application claims the benefit of U.S. provisional patent application No. 62/172,860 filed Jun. 9, 2015, the disclosure of which is incorporated herein by reference in its entirety.

TECHNICAL FIELD

Embodiments of the present disclosure relate to a computer processor, and in particular, to a computer processor with advanced operating system support.

BACKGROUND

An operating system has several responsibilities. An operating system needs to isolate processes from each other. Specifically, the operating system needs to permit multiple programs to run without interfering with each other. In particular, a process should prevent an erroneous or malicious program from observing or causing damage to other processes.

An operating system needs to coordinate access to shared system resources. Generally, this is done by preventing a program from directly accessing the resources; instead, the program makes a request to the operating system, and the operating system can either accept or deny the request. If the operating system accepts the request, in most circumstances, the operating system will execute the request on behalf of the program.

To accomplish these tasks, the operating system needs features from the processor that allow the operating system to put the processor in a low privilege execution mode where instructions being executed by the processor cannot access certain resources. The operating system may have a mechanism by which the processor can be switched in a controlled fashion to a higher privilege execution mode where the processor can access the resources.

As an illustrative example, a memory location is shared among multiple processes. Multiple processes can write to the memory location, but can only write an appropriate value. One way to accomplish this is to use the virtual-to-real translation mechanism to protect a page containing the memory location against writes. When a low privilege program attempts to write to the memory location, the processor takes a write-protect exception, which then transfers control to the appropriate exception handler with higher privilege that determines whether the value being written is appropriate, and if so, writes the value to the memory location.

There needs to be a mechanism that allows the exception handler code to write the memory location, even though the original program code could not. This is typically accomplished by increasing the permissions of the processor when an exception is taken.

Now, assume that it is desired to write a program that will attempt to bypass the operating system controls and write an inappropriate value to the memory location. There are several potential avenues of attack.

The program could attempt to change the page protection to give itself write permission. However, the structures and processor state that control the page permissions are themselves protected, and can only be accessed after the processors privileges are increased.

The program could attempt to add a new virtual page that maps to the same memory location, but this time with write permissions. However, the structures and processor state that control mappings are protected.

The program could attempt to increase its privileges by directly modifying the relevant processor state. However, the processor state that control privilege is protected, and is protected against being directly modified by a program.

The program could attempt to increase its privileges by executing an instruction that causes a privilege escalation that then transfers control to program code that will write the inappropriate value. However, there are only a limited number of privilege escalation paths available, each of which transfer control to a predetermined instruction address. The processor state that controls the destination of the escalation paths is protected, and can be modified only with appropriate permissions.

The program could attempt to overwrite the operating code that is the target of a privilege escalation with its own and then cause a privilege escalation, causing the processor to execute the program's code with increased privileges. However, the pages containing the operating system code are at least write-protected, so that overwriting the code is impossible unless the program is already running in a mode where the processor has privileges.

Thus, operating system protections can be properly implemented using the mechanisms of: having lower privilege mode for running the processor in which it can only access and/or modify a restricted set of memory locations and processor state; and, employing a method that simultaneously escalates the permissions of the processor and transfers control to a controlled set of execution locations.

There are two situations where control needs to be transferred to the operating system while a program is running. One situation is involuntary, where an external interrupt (such as I/O device interrupt) or an internal exception (such as a page-table miss) needs to be handled by the operating system. These involuntary transfers are known as exceptions or interrupts. The other is voluntary, when a program needs the operating system to perform some function (such as I/O) on its behalf. These kinds of voluntary transfers are called system calls.

The processor needs to provide a mechanism to implement system calls. Quite often this is a special instruction that transfers control to a specific address (or one of a set of addresses) and that increases the privilege simultaneously. To prevent the program from using this mechanism to gain access to privileges that it is not supposed to have, the potential targets of the system call are set up by the operating system and cannot be modified without increased privileges. The code at all potential targets of system calls is set up by the operating system, and performs only a limited number of functions. Further, the operating system checks to see if the program is entitled to do so before performing the functions. The code at all potential targets of the system call is protected against writes by the program, so that it cannot be modified to perform some action the program is not entitled to.

Exceptions and interrupts are both used to describe exceptional events that cause the normal flow of the program to be interrupted and control diverted to specialized interrupt (or exception) handling code. The terms are sometimes used interchangeably; however, in general, an interrupt is an event that is external to the program being run, and an exception is an event that is caused by the running of the program.

Some examples of interrupts are: input/output device interrupts: the interrupt handler code will take action to respond to the input or output event, generally copying the results of the input action to the appropriate program buffers, or scheduling more output tasks from pending program requests; timer interrupts: depending on the nature of the timer interrupt, the interrupt handler code can take several actions, which may include: watchdog interrupt: cause emergency cleanup, potentially including terminating the running process; time-slice interrupt: cause the running process to be context switched out, and another process to be context switched in; and event interrupt: cause an event to be added to a program's timer event queue.

Some examples of exceptions are: divide-by-zero: for processors that have integer divide instructions; floating point instruction exception: the IEEE standard defines several exceptions that must be detected by the floating point hardware; illegal instruction exception; and, data/instruction debug: the users specifies certain addresses or address ranges for the hardware to monitor; when the program tries to access/execute one of these addresses, the program takes an exception. This helps with debugging program behavior.

The examples above can typically be handled with or without operating system intervention. There are others which definitely require operating system intervention, such as a page-table miss: depending on whether the hardware has software managed translation lookaside buffers or hardware managed translation look-aside buffers (TLBs), this exception requires the operating-system to do different things to update the virtual-to-real mapping of pages. However, it is necessary for the operating system to be invoked.

Then there are some circumstances which are a gray area. Depending on the desired behavior, the operating system may need to get involved, or it can be handled entirely in user code, including: no read/write/execute permission; and executing privileged instruction.

On most non-embedded applications, a user program runs with virtual to real page translation enabled. This is called virtual mode. By contrast, if translation is disabled, and all processor addresses are assumed to be actual physical addresses, the processor is said to be running in real mode.

On an exception, some processors switch to real mode. Other processors continue to run in the mode that the user program was running in.

It has been found sufficient to have two levels of privilege, generally called user and super-user. When running at the user privilege level, the processor has access to only some pre-configured memory regions and some registers; specifically, the processor does not have access to any state or resources that would allow the processor to increase its access. When running at the super-user privilege level, the processor can access all state, including memory.

In the two-privilege level model, when a program running in user mode takes an exception, the program switches its privilege level to super-user, and starts executing code from a predefined address.

Some processors have multiple levels of privileges, each granting different levels of privilege. For instance, the x86 architecture defines 4 rings of protection. However, while there may be some benefit to these additional levels of protection, two privilege levels have proved to be sufficient.

After control is transferred to the exception handling code from user code, part of the existing processor state, such as some of the general purpose registers, need to be saved so that they can be used by the exception handling code. After the exception handling code has run, prior to control being handed back to the user code, the saved state is restored.

The code that saves the register state must not disturb any of the state it is saving before that state is saved. This can be quite difficult to achieve. One solution is to have the processor save some of the state as part of the exception process.

Another solution is to have extra registers that are only accessible in super-user mode, which the operating system reserves for exception handling code. This could be an additional register, such as a system stack pointer, that can be used as a base address by a sequence of store instructions to save state to memory. Another possibility is to copy part of the user state into these extra registers, then use the freed state to set up the memory save addresses, and save user state to memory.

After the exception handler has dealt with the exception, the processor may need to resume execution at the point where the program was interrupted. This requires that at the point the exception was taken the following information must be saved: the instruction address at which normal processing is to be resumed; this is generally the address of the instruction that was interrupted or of the next instruction; and, the original value of any state that is modified as part of the taking the exception; this generally includes the original values of the processor privileges at the point of the exception.

As part of the exception return process, there is a mechanism that will simultaneously restore the processor privileges to the saved value and resume execution at the saved instruction address. This is usually performed via a return-from-interrupt or return-from-exception instruction.

The same mechanism is also used by the operating system to start a new process. The starting point of the new process is stored to the instruction save location and the initial privileges of the program are stored to the privilege save location, and a return from exception sequence is executed. At this point, the new process is started at the desired address at the desired privilege level.

On some processors, when an interrupt is taken, all further interrupts are disabled. On such a processor, typically the first thing the interrupt handling code does is to save the user state and the saved interrupt return address/state. After saving those values, the processor re-enables interrupts. It is necessary to save the interrupt return address/state prior to re-enabling interrupts, otherwise if a second interrupt occurs, it will overwrite these values, and the interrupt handler for the first interrupt will not be able to determine where to return to after handling the interrupt.

By contrast, other processors do not disable interrupts on taking an interrupt. On such processors, it is entirely possible that a second interrupt is accepted prior to the first one having saved all necessary state. Such processors typically have multiple places to save interrupt return address/state information. A processor can push these values onto the stack. Alternatively, a processor can support some number of nested interrupts, and have sufficient register state to support this number of interrupts.

Interrupts and exceptions are typically ordered in priority. For instance, a page miss exception typically has higher priority than an I/O interrupt. If there are multiple interrupts pending, then the processor will typically handle the higher priority one first. The most common case where there are multiple interrupts pending arises when interrupts have been disabled for some time; when interrupts are re-enabled, there can be multiple interrupts available for servicing.

On processors with only one address at which all interrupts start executing, there is no difference in the way the processor takes the interrupt; after taking the interrupt, the interrupt handler will determine the highest priority pending interrupt and handle it first. On a processor with different addresses for different interrupts, the processor will determine the highest priority pending interrupt and transfer control to the interrupt handler address for that interrupt.

On some processors with nested interrupts, an interrupt handler for an interrupt can be interrupted by an interrupt with a higher priority. This allows higher priority tasks to be handled, even if the processor is currently handling an interrupt.

It is sufficient to have two levels of privileges to implement an operating system with appropriate protection. However, it is becoming desirable to implement virtualization, where multiple operating systems can be run on the same process without modification. One way of accomplishing is to have another level of privileges. This permits the implementation of a hypervisor (more specifically, a type-1 hypervisor, also known as a native or bare-metal hypervisor).

In this case, there are 3 privilege levels—user, super-user and hypervisor. The hypervisor privilege level has access to all machine resources, while the super-user has the illusion that it has access to all resources. However, when a super-user attempts to access certain resources, the access will cause an exception to hypervisor state. At that point, the hypervisor will intercept the request and execute it in a fashion that preserves the illusion that the operating system is the sole operating system running on the processor.

As an example, consider the virtual page mapping process. From the point of view of the operating system, it has a certain amount of real memory, to which it maps the virtual pages of the user. In actuality, this "real memory" is actually further mapped by the hypervisor layer to the actual real physical memory. When the operating system tries to map a virtual memory page to a "real" memory page, the attempt causes an interrupt to the hypervisor layer. The hypervisor layer maps this "real" memory to some physical memory page, and updates the mapping tables so that when the operating system's user program attempts to access the virtual page, it will access the physical page assigned by the hypervisor.

Multi-threaded processors are processes can hold the state for multiple user processes simultaneously.

Depending on implementation, a processor can run instructions from each of these user processes in a variety of different ways. These instructions are generally grouped into one of two types: simultaneous: instructions from different processes are running simultaneously; and, temporal: instructions from only one thread is running at time.

In simultaneous multithreading, the privileged state is typically also replicated to allow threads to be able to simultaneously be executing at a privileged level. This makes it look as though there are multiple cores on the processor, and operating systems typically treat them as a special case of multi-processors.

In temporal multithreading, specially coarse-grained multithreading, only one thread will be executing in the privileged mode at any one time, so only one copy of the privileged state is necessary. The operating system can treat the processor as a single processor, albeit one with a very fast context switch.

SUMMARY

The above-described problems are addressed and a technical solution is achieved in the art by providing a computer processor with advanced operating system support. The computer processor may include a plurality of hardware threads. The computer processor may further include state processor logic for a state of a hardware thread. The state processor logic may comprise per thread logic that may contain state that is replicated in each hardware thread of the plurality of hardware threads and common logic that may be independent of each hardware thread of the plurality of hardware threads. The computer processor may further include single threaded mode logic to execute instructions in a single threaded mode from only one hardware thread of the plurality of hardware threads. The computer processor may further include second mode logic to execute instructions in a second mode from more than one hardware thread of the plurality of hardware threads simultaneously. The computer processor may further include switching mode logic to switch between the first mode and the second mode.

The state processor logic may permit a portion of state common to all hardware threads to be accessible only when the single threaded mode logic executes instructions in the single threaded mode. The switching mode logic may switch between the single threaded mode and the second mode by taking an interrupt. Taking the interrupt may cause the switching mode logic to save a current return address in a processor status register for all hardware threads of the plurality of hardware threads, to halt all but one active hardware thread of the plurality of hardware threads, and to cause the active hardware thread to start executing from an interrupt handler address.

The computer processor may further include processing logic that when executed in the single threaded mode calls all of the hardware threads of the plurality of hardware threads having instructions to execute to resume execution at a saved return address with a saved processor status. The processing logic may be activated by executing an instruction designed to cause resumption of the second mode.

The computer processor may further include processing logic to examine and modify the state of inactive hardware threads while the state processor logic is running in single threaded mode.

The computer processor may further include privilege logic to divide the common logic and the replicated state of a hardware thread into at least two groups of state, to determine a privilege level for the thread, wherein at least one of the groups of state is inaccessible at a first privilege level, and switch between privilege levels. The computer processor may further include privilege logic to divide the replicated state of a hardware thread into at least two groups of state, to determine a privilege level for the thread, wherein at least one of the groups of state is inaccessible at a first privilege level, and switch between privilege levels.

A switch from a more restrictive privilege level to a less restrictive privilege level may be effected using an interrupt that simultaneously changes the privilege level and changes an execution point of the computer processor to a predetermined location. A switch from a more restrictive privilege level to a less restrictive privilege level may occur by processing logic to execute an instruction that simultaneously changes the privilege level and changes an execution point of the computer processor to a predetermined location.

BRIEF DESCRIPTION OF THE DRAWINGS

The present invention may be more readily understood from the detailed description of an exemplary embodiment presented below considered in conjunction with the following drawings:

FIG. 2 is a table of control register bit fields.

DETAILED DESCRIPTION

Figure 1:
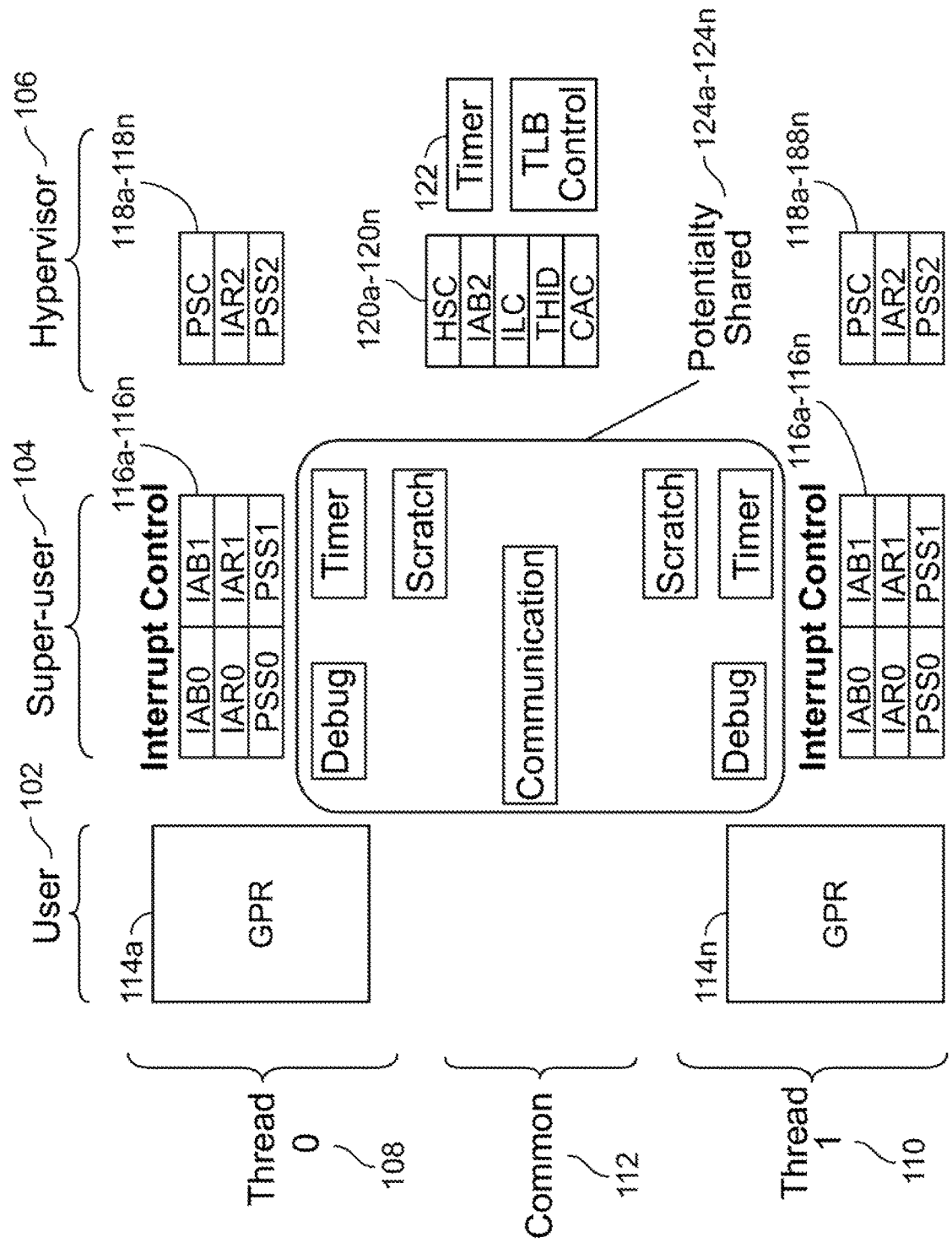
FIG. 1 is a block diagram of a register organization for two threaded implementation of a processor.

Embodiments of the present disclosure introduce an architecture and implementation of a computer processor that deals with several issues related to the implementation of operating systems on a modern processor. These include abstracting the specifications of implementing operating system routines by means of trap instructions, introducing additional levels of privileges to allow for hypervisors, distinguishing between interrupts that interrupt all threads vs. those that interrupt only one thread, and implementing controls that allow control of sharing of resources between hardware threads.

Interrupts and exceptions are organized into different groups called levels. Each level has multiple interrupts/exceptions that are organized by priority.

Interrupts are nested by level. An interrupt belonging to higher priority level can interrupt a running interrupt handler that belongs to a lower level priority level, as well as interrupting user code. When an interrupt is taken, the interrupt blocks all interrupts of the same or lower level interrupts, until explicitly re-enabled.

Each interrupt/exception transfers control to a different entry point that is determined by the interrupt and a base register for the interrupt's level. The interrupts are numbered starting at 0. The i-th interrupt transfers control to the interrupt handler at the value in the base register plus an offset of i times some number of instructions. If the number of instructions is picked to be 64, and each instruction is 4 bytes, interrupt i will branch to base+256*i.

System calls are implemented by an instruction that causes the equivalent of a (software generated) exception. They form their own interrupt level. This is the lowest priority level, level 0.

The basic exception handling components in the proposed architecture is similar to that found in other processors. The registers include: Process Status and Control Register (PSC): this register holds information about the current processor status, including: privilege level, translation mode, and interrupt enable/disable.

The various bits in the PSC that are relevant are: user: when set, the processor is running in user mode, and access to control registers is disabled. When clear, the processor is in super-user mode; and ienn: when set, interrupts from interrupt level n can be taken. When clear the interrupts will not be taken. There is one bit for each interrupt level.

The registers further include: Process Status Save Registers (PSSn): On an interrupt/exception/system call, these registers hold the value of the PSC register prior to the interrupt. There is one for each level of nested interrupt; Interrupt Return Address Registers (IRAn): On an interrupt/exception/system call, these registers hold the interrupt return address. There is one for each level of nested interrupt; Interrupt Base Address Registers (IBAn): These registers identify the base address for each interrupt level; and Scratch Registers: these are registers that are only accessible in privileged mode. The only thing that can be done with these registers is to copy values to/from general purpose registers. The registers are used to hold process information and to bootstrap the saving of user state.

The trap instruction is used to implement system calls. Its format is: trap num

Here num is the interrupt number. When a trap at instruction address PC is executed, the following actions happen:

| | | |
|---|---|---|
| IRA0 | <- PC+4 | ; after handling trap, return to next |
| | | ; instruction. 4 byte instructions. |
| PSS0 | <- PSC | |
| PSC.user | <- 0 | ; switch to super user privilege level |
| PSC.ien0 | <- 0 | ; traps interrupts are disabled |
| PC | <- IBA0 + num*256 | ; interrupt handler address based on |
| | | ; trap number |

Since traps form interrupt level 0, the IRA/PSS/IBA involved are those associated with level 0. The PSC user bit is cleared, running the processor in super-user mode. Also, further traps (interrupts at level 0) are disabled.

Other interrupts are initiated by the hardware, either by executing an interrupting instruction (e.g. a page fault on a load) or are triggered by an external signal (e.g., I/O pending). The behavior is identical to that of a trap, except for the differences caused by the levels. Different IRA/PSS/IBAs will be used. More interrupt bits will be cleared to disable all lower level interrupts. Also, the return address will be determined by the nature of the interrupt; it could be the address of the currently executing instruction.

For example, one possible set of actions after executing interrupt number num of level 2 could be:

| | | |
|---|---|---|
| IRA2 | <- PC | ; one possibility - re-execute |
| | | ; instruction after handling interrupt |
| PSS2 | <- PSC | |
| PSC.user | <- 0 | ; switch to super user privilege level |
| PSC.ien0 | <- 0 | ; traps interrupts are disabled |
| PSC.ien1 | <- 0 | ; level 1 interrupts are disabled |
| PSC.ien2 | <- 0 | ; level 2 interrupts are disabled |
| PC | <- IBA2 + num*256 | ; interrupt handler address based on |
| | | ; interrupt number. |

The retfi instruction is used to implement return from interrupts. Its format is:
retfin Here n is the interrupt level. When the retfi is executed, the following actions happen:
PC←IRAn
PSC←PSSn The various registers that are accessible only in super-user mode are collectively called special purpose registers (SPR). Generally, these registers are used to control the behavior of the processor, and writing to them can have side-effects. The PSC, IRA, PSS and IBA registers mentioned above are all special purpose registers.

These special purpose registers need to be read and/or written. This is usually done by an instruction that copies the values from/to the special purpose register to/from a general purpose register. Some architectures have a separate instruction for each class of special purpose registers; there are two instructions, one for transferring values from an SPR to a GPR, and one for GPR to SPR transfers. These are:
rsetspr $rN,SPR; copy value from SPR to GPR N
sprsetr $rN,SPR; copy value from GPR N to SPR There are many variations that are known. Some of these are: a table of interrupt vector addresses. To find the interrupt handler address for interrupt n, they use the instruction address stored in the n-th entry of the table; a common address for all interrupts, or all interrupts of the same level. When the interrupt is taken, the interrupt number is stored to a register. The interrupt handling code reads that register to determine the interrupt it is handling; pushing the interrupt return address/status onto a stack in memory, instead of saving them to registers; having only one level of interrupt; and, the interrupt enable, user mode, and translation enable bits are in the same register. In other architectures, the bits may be spread across multiple registers, and may be controlled differently.

The purpose of a hypervisor is to allow multiple operating systems to run concurrently on one processor, while giving each of them the illusion that they are the only operating system running on it. Ideally, this should not require any modification to the operating system—the code running on top of a hypervisor should be identical to the code running without a hypervisor.

To preserve this illusion, the hypervisor needs to trap any actions that will change protections. It will also have to intercept any actions that modify state that will be shared across multiple operating systems. For instance, the hypervisor needs to intercept any changes to the page table made by an operating system and replace them with an actual mapping. Similarly, it needs to intercept an I/O requests from an operating system, and schedule them along with all other requests from other operating systems running on the hardware.

The PSC register has a bit that controls the hypervisor mode. When the bit is 0, the CPU is in hypervisor mode, with access to all registers in the processor.

Any attempt to clear the hypervisor bit to 0 by using a sprsetr or retfi instruction when the processor is not already in hypervisor mode will cause an interrupt.

Interrupts will be divided into two categories—those that raise processor privilege into hypervisor mode, and those that raise privilege into super-user mode. Hypervisor level interrupts should be reserved for those situations where the interrupt handler will need to take some actions to virtualize the interrupt handler behavior.

An interrupt that does not require access to processor-wide state is best handled as a super-user mode interrupt. As an example of this, floating-point or debug exception clearly can be handled at the super-user level. By contrast an I/O exception for a shared I/O device will need to be handled at the hypervisor level, so that the hypervisor can deal with the I/O.

To add flexibility, the processor can use a register to indicate whether an interrupt/exception is handled in hypervisor mode or in super-user mode.

The hypervisor interrupts would be of higher level than super-user interrupts.

An SPR that will affect shared processor state or change certain protections cannot be accessed directly by the processor when in super-user mode. Instead, an attempt to use a rsetspr/sprsetr instruction to access these SPRs will cause an exception that would switch the processor into hypervisor mode.

Other instructions that impact shared state will also need to cause interrupts if executed in non-hypervisor mode. These include instructions that affect cache behavior, specifically cache locking and flush instructions.

There is a CPU status and control (CSC) register that holds processor specific control information. This register is different from the PSC, which is intended to hold the control information for a process, i.e., information that will change as processes are swapped in and out, or as control moves from user programs to operating system.

The hyper bit of the CSC register controls whether the processor is running with 3 levels of privilege or with 2. When the bit is clear, super-user and hypervisor modes are equivalent.

This functionality is useful for those cases where the additional hypervisor functionality is not needed.

The proposed architecture can either be implemented as a single-threaded core or as a multi-threaded core. In the case where the implementation is multi-threaded, the implementation can use one of the traditional approaches discussed previously. Alternatively, it can use the approach described in this section.

The proposed architecture uses symmetric multi-threading, but only to a limited extent. The user space register are replicated, as are a subset of special purpose register. The special purpose registers that are replicated are those that are commonly required by the operating system for handling user program specific tasks. They would include: timers: for scheduling time based interrupts, both to the program and to the operating system; data & instruction debug registers; scratch registers: to allow exceptions to be handled per-thread; and interrupt return & status save registers.

Certain interrupts and exceptions that can generally be handled without accessing other special-purpose registers are handled by per-thread interrupts. These include the software exceptions caused by the trap instructions.

When a per-thread interrupt is encountered, the other threads continue to execute unchanged. The thread that takes the interrupt is switched to super-user mode and control is transferred to the appropriate interrupt handler address.

Modifying certain aspects of state will affect all threads. For instance, changing the page-tables, or the translation look aside buffers will potentially impact multiple threads. However, usually there will generally be only one copy of this state on the processor, rather than multiple copies. To simplify access and control of such resources, when an interrupt that would modify require the modification of these non-replicated resources arrives, all threads on the processor but one are suspended. The thread that is not suspended will be switched to super-user mode, and control transferred to the appropriate interrupt handler. This is called an all-thread interrupt.

When the processor resumes execution after an all-thread exception, the non-suspended thread resumes execution based on the saved program status and instruction addresses, as in the single threaded case. In one implementation, the other threads will resume execution at the points where they were suspended.

An alternate way of suspending all threads is to save the interrupt return address/process status save registers for each suspended thread. When a thread is suspended due to an all-thread interrupt, its current process status and the address of the next instruction to be executed is saved to an IRA/PSS register pair.

Further, there will be means for the non-suspended thread to read and modify the IRA/PSS pair for each of the suspended threads. By modifying the IRA, when the thread is resumed, it will resume at another address.

To provide for more flexibility, the proposed architecture has means for the non-suspended thread to inspect and modify the state for all threads, including the suspended threads, while in an all-thread interrupt.

In the current architecture, a special register holds the identity of the context in which the processor is running. By changing the value in the thread identifier register to point to a different thread, the processor will start executing in the context of that different thread—i.e., the processor will read and write instructions from the thread pointed to by the thread identifier register. Thus, the executing instructions will read and write registers from that thread.

Privilege handling has a little complication. When the thread-id is set to a suspended thread, reads and writes to the PSC will affect the PSC of the suspended thread. However, even in this mode, the processor still needs to be running at the original privilege level. This can be achieved by: ensuring the PSC that is used by the processor to control its privileges is the PSC of the original thread, or having a separate PSC for the all-thread interrupt level.

Apart from the shared scratch registers, there are non-shared scratch registers. These non-shared scratch registers can be separate registers or some subset of the scratch registers. Since these registers are not shared, they can be used by an all-thread interrupt handler to hold values even after the thread-id is changed.

These register can also be used to boot-strap the spilling of the state of suspended threads.

There is a synergy between hypervisor and the multi-thread interrupt model we have been describing. All hypervisor interrupts will be treated as all-thread interrupts (and vice-versa). This is an obvious extension since the situations in which it is necessary to modify state that can affect multiple threads are also the situations in which the state change would affect multiple operating systems.

Consequently, in the combined model of a multi-threaded implementation with hypervisor architecture, whenever a hypervisor interrupt is taken, it is treated as an all-thread interrupt.

In multi-threading, generally the state of the threads should be isolated from each other. However, in certain applications, such as real-time processing, it would be beneficial for the threads to be able to co-operate with each other.

In this model, it is assumed that the number of co-operating threads is less than or equal to the maximum number of threads that can be supported by the hardware. Further, it is assumed that all these threads will be in processor at the same time.

One way to enhance the co-operation of these threads is to allow them to communicate with each other using registers. There will be a set of communication registers, and a mask that will specify which threads will be allowed to access them.

The registers can be modified by a thread by writing to them in one of several ways: direct write: the register is over-written with a value; set on 1: the bits of the register are set to 1 where the value is 1; this is the equivalent of an "or;" and, clear on 1: the bits of the register are cleared where the value being written are 1; the is the equivalent of an and-with-complement These registers will allow the threads to pass values from thread to thread quickly. The ability to clear/set on 1 allows threads to implement barriers and other synchronization primitives.

The other way to enhance co-operation of threads is to allow them access to each other's resources, where practical. For instance, the threads could share the data-debug registers, so that if any of the threads reads/writes the monitored address, it takes an exception. This increases the pool of common resources and allows them to be managed from a centralized location.

In this section, a two-threaded processor implementation is described with integrated hypervisor and all-thread interrupt/exception support. It should be clear from the description how to scale this design up to support more threads, or to scale it down to a single-threaded implementation.

The organization of the registers in the proposed implementation is shown in FIG. 1. The registers are organized by the privilege level—user 102, super-user 104, 106 hypervisor—and by whether they are thread-specific 108, 110 or common 112.

For user/thread: These are the usual user state registers. FIG. 1 shows only the general-purpose registers 114a-114n, but, depending on the instruction set architecture, there can be other registers, such as the floating-point registers.

For super-user/thread: These are the registers 116a-116n that are used by an operating system to control the behavior of processes. Access to these registers 116a-116n needs to be restricted so as to prevent a process from interfering with other processes. However, modifying these registers will not impact resources common to both threads. Hence the access to these registers 116a-116n does not need to be restricted to the hypervisor level. The registers 116a-116n in this group include: super-user level interrupt control registers; debug/timer/scratch registers as examples of register groups that may or may not be present; and other registers that are not shown, but may be appropriate, depending on the instruction set architecture being implemented.

For hypervisor/thread: These are per-thread registers 118a-118n needed manage the behavior of the thread by the hypervisor. The following registers are shown: PSC: program state control; IAR2: the hypervisor level interrupt return; and PSS2: the hypervisor level program state save.

For hypervisor/common: These are registers 120a-120n needed by the hypervisor to control the behavior of the processor. They are independent of the number of threads. The following groups of registers 120a-120n are shown, including: interrupt control registers. These include: HSC: the hypervisor level control register, which defines the translation mode, caching mode, and other controls that are active when the processor is running in hypervisor mode; IAB2: the hypervisor level interrupt address base; ILC: the interrupt level control that, for each interrupt, determines if it is a super-user or hypervisor interrupt; THID: the thread identifier that specifies the thread whose per-thread state is being accessed; CAC: Co-operative access control: this register controls the access rights by the various threads to the communication registers and potentially shared registers of other threads; timer/TLB control 122 are shown as examples of register groups that may or may not be present, depending on the detail of the architecture and implementation; and other registers that are not shown, but may be appropriate, depending on the instruction set architecture being implemented.

For super-user/common: These are the registers 124a-124n that are used to communicate between threads. Since these registers 124a-124n are employed to improve inter-thread performance, they must be accessible while all threads are running. The registers 124a-124n have been shown as accessible at the super-user level, so as to add a level of protection. However, it is equally possible to have them accessible at the user-level, based on access controls specified in the hypervisor CAC register.

There is another grouping of registers possible—those registers that could potentially be shared if the threads were co-operative threads. Identified are the timer, debug, and scratch registers as potential candidates for sharing. The shared registers could include other registers, or a sub-set of these, based on the implementation. Further, the CAC register instead of just specifying shared or not shared, could specify the sharing for each of the sets separately.

Some of the bit-fields of the PSC and the HSC are shown in FIG. 2. The bit fields include: NHYP (HSC only): Hypervisor mode control. If it is 0, the processor is in hypervisor/single-threaded mode; ITHID (HSC only): Thread Identifier of the thread that is associated with the interrupt into hypervisor mode; TRANS: Instruction/Data page translation controls; CACHE: Instruction/Data cache controls; IEN0/IEN1/IEN2: interrupt enables; FPEN: floating point interrupt enable; DEBUG: debug compare and interrupt enables; and, PROM (PSC only): process identifier of process that is running. Generally used by page translation mechanism as part of the translation key.

Obviously different designs can have different contents and layouts for the control registers.

Figure 3:
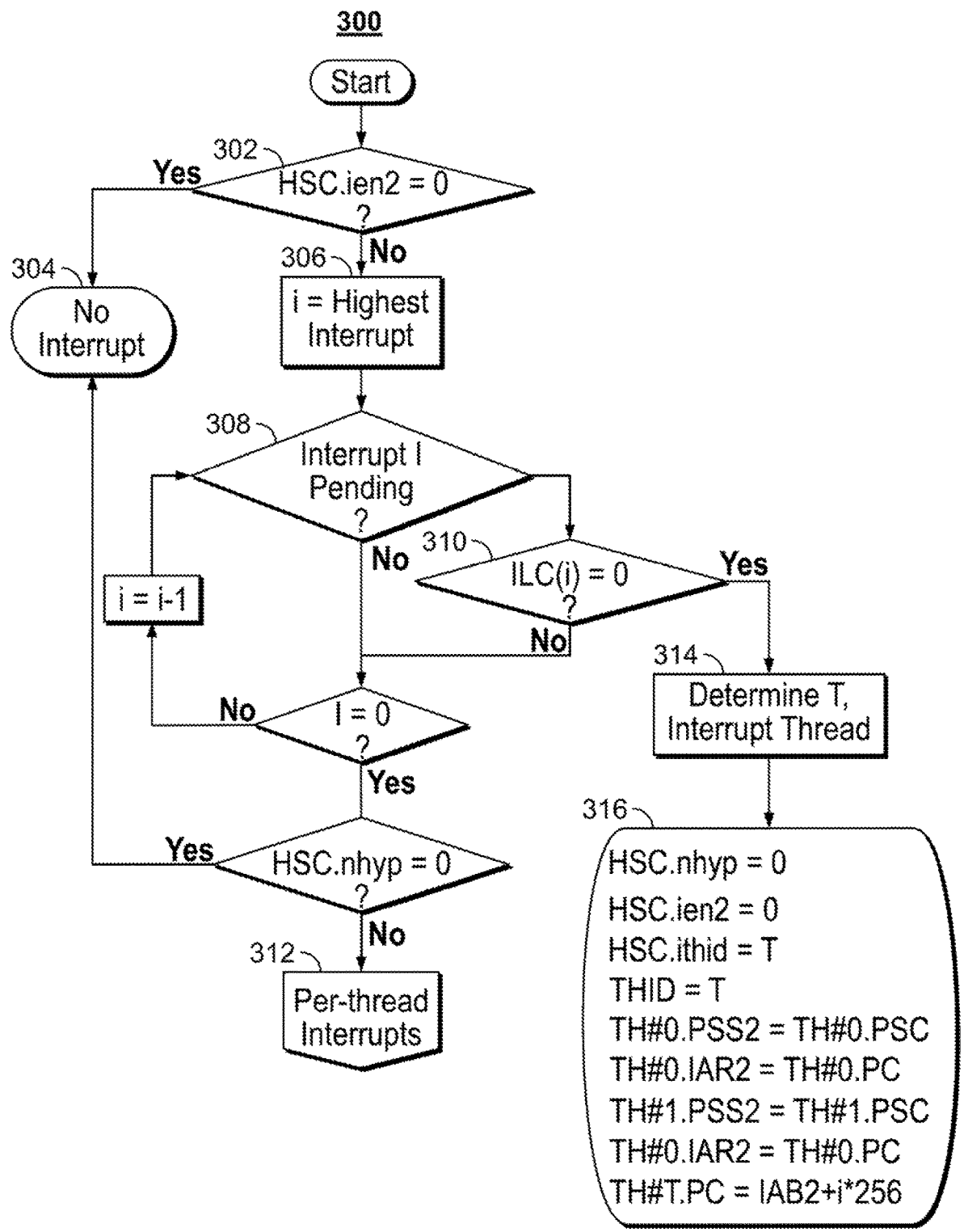
FIG. 3 is a process flow illustrating how the processor of FIG. 1 determines whether to take a hypervisor level, all-thread interrupt, and the resulting actions an execution pipeline.

FIG. 3 shows the process 300 by which the processor determines whether to take a hypervisor level, all-thread interrupt, and the resulting actions. To summarize: at block 302, if hypervisor interrupts are disabled (i.e. HSC.ien2=0), then at block 304, there can be no interrupt. At block 306, the processor first looks at all interrupts from highest priority to lowest, checking to see if they are active and if they are all-thread interrupts. In the specific case shown, the bits of the ILC register corresponding to the interrupt indicate if it is a hypervisor/all-thread interrupt or a per-thread interrupt. Other implementations can hard-wire certain interrupts at either level, or have other mechanisms for determining the kind of interrupt. At block 308, if no all-thread interrupt is to be taken, then at block 310, if the processor is running in single-threaded/hypervisor mode, then there can be no per-thread interrupts; otherwise, at block 312, the processor will look in each thread to determine if there are any interrupts for that thread. At block 308, if an all-thread interrupt is to be taken, then at block 314, a thread is picked for running the interrupt routine. In some cases, the choice may be obvious; for instance, if the interrupt is caused by an instruction from some thread page-faulting, then that thread is an obvious choice. In other cases, the choice is not straight-forward. For example, either of the threads could handle an I/O interrupt. In that case, the hardware could pick arbitrarily, always pick one of the two threads, pick based on other control registers, etc. At block 316, after determining the thread, the PC & PSC for both threads are saved in the IAR2/PSS2 respectively, the HSC is set up, and finally the PC of the picked thread is set to the interrupt handler address.

Figure 4:
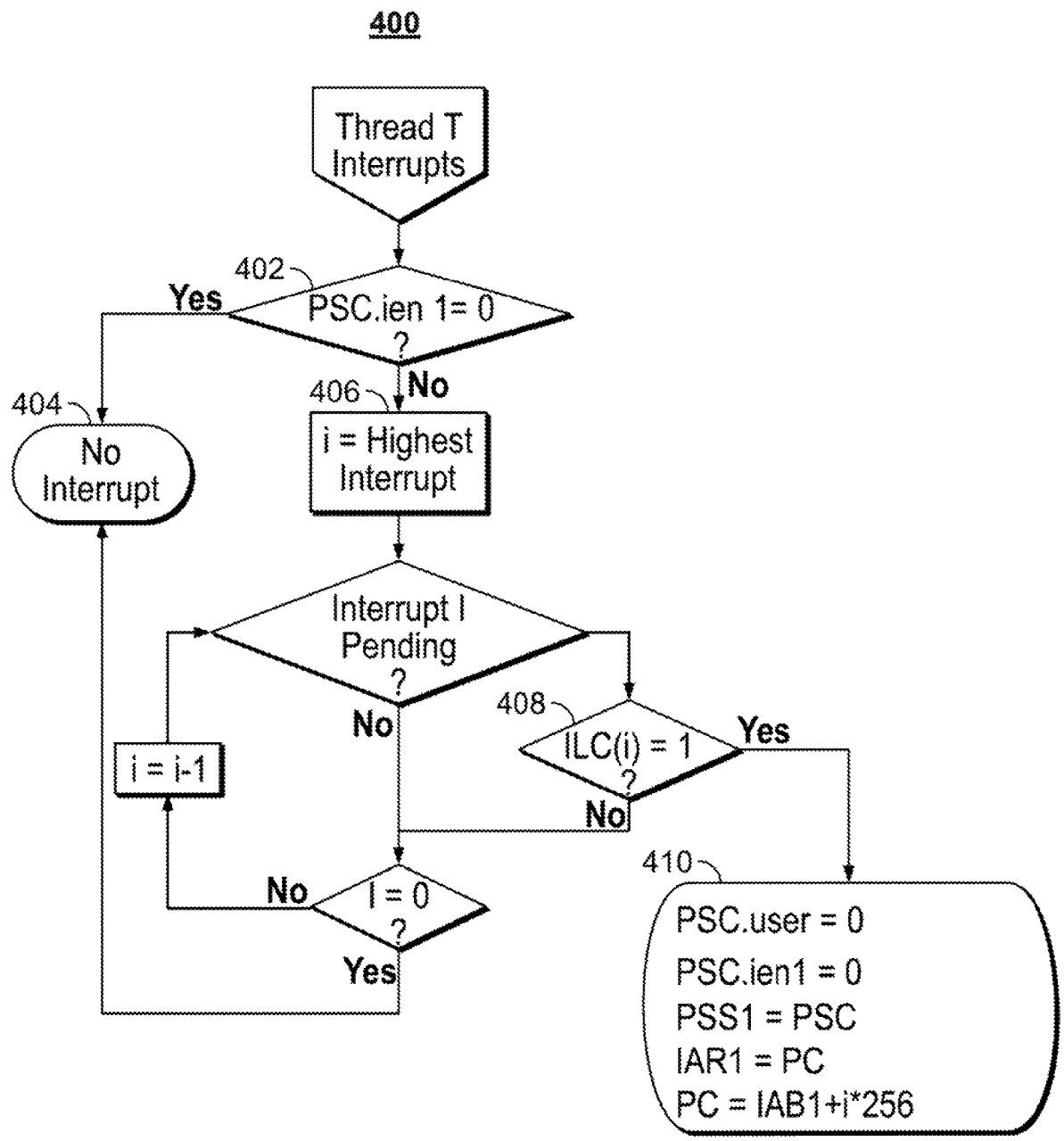
FIG. 4 is a process flow illustrating how the processor of FIG. 1 checks each thread separately to determine if either of the threads is to be interrupted.

After processing the all-thread interrupts, assuming that the processor is not running in single-thread mode and that no interrupt was taken, the processor will then check each thread separately to determine if either of the threads is to be interrupted. The flow-chart 400 for this process is shown in FIG. 4. To summarize: at block 402, if the super-user interrupts for that thread are disabled (i.e. PSC.ien1=0), then at block 404, there can be no interrupt for that thread. At block 406, the processor first looks at all interrupts from highest priority to lowest, checking to see if they are active and if they are per-thread interrupts, based on the ILC in the implementation shown. At block 408, if a per-thread interrupt is to be taken, then at block 410, the PC & PSC for the thread is saved in the IAR1/PSS1 respectively, the PSC is set up, and finally the PC is set to the interrupt handler address.

The common access control logic changes between 2 and more than 2 threads. In the case of 2 threads, the CAC only needs to indicate whether sharing is enabled; if it is, then both threads will see the state of each other. However, if there are more than 2 threads, the CAC also has to indicate what is shared between which threads. For instance, if there are 4 threads, then it may be desired to have threads 0 & 1 share some state and threads 2 & 3 share some other state, but not 0/1 with 2/3.

A straight-forward method to accomplish this is to have an N-bit field for each shared resource, where N is the number of threads. A '1' in bit position T would indicate that thread T has access to that resource. Thus, in the case above, assume that the processor has two communication registers, 0 & 1. In that case, the CAC would have 8 bits, 0:3 controlling access to communication register 0 and 4:7 controlling access to communication register 1. Writing the bits 11000011 would give threads 0&1 access to communication register 0, and threads 2&3 to communication register 2.

Figure 5:
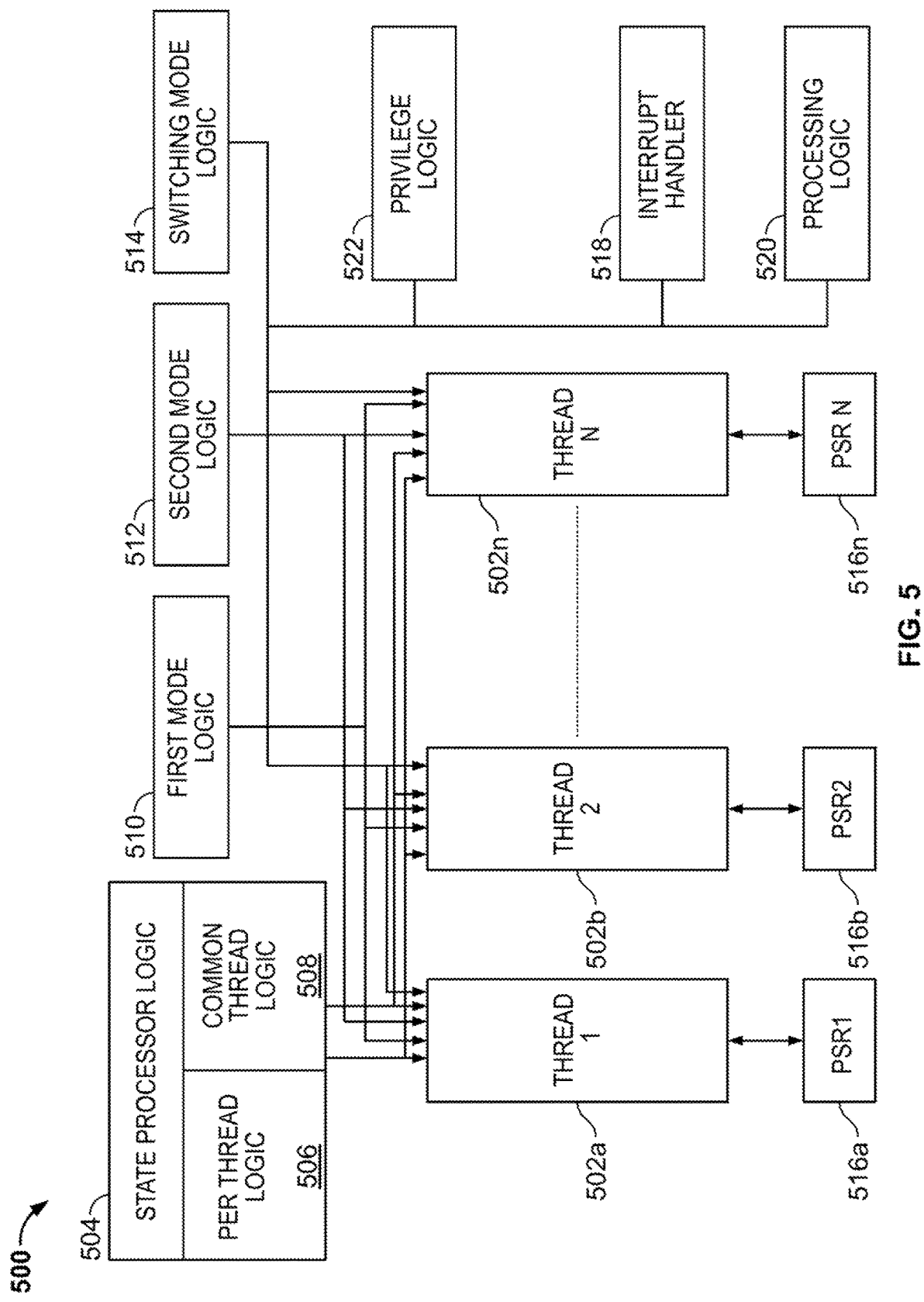
FIG. 5 is a block diagram of an architecture of a computer processor with advanced operating system support, in which examples of the present disclosure may operate.

FIG. 5 is a block diagram of a computer processor 500 with advanced operating system support, in which examples of the present disclosure may operate. The computer processor 500 may include a plurality of hardware threads 502a-502n. The computer processor 500 may further include state processor logic 504 for a state of a hardware thread (e.g., 502a). The state processor logic 504 may comprise per thread logic 506 that may contain state that is replicated in each hardware thread of the plurality of hardware threads 502a-502n and common logic 508 that is independent of each hardware thread of the plurality of hardware threads 502a-502n. The computer processor 500 may further include single threaded mode logic 510 to execute instructions in a single threaded mode from only one hardware thread (e.g., 502a) of the plurality of hardware threads 502a-502n. The computer processor 500 may further include second mode logic 512 to execute instructions in a second mode from more than one hardware thread of the plurality of hardware 502a-502n threads simultaneously. The computer processor 500 may further include switching mode logic 514 to switch between the first mode and the second mode.

The state processor logic 504 may permit a portion of state common to all hardware threads 502a-502n to be accessible only when the single threaded mode logic 510 executes instructions in the single threaded mode. The switching mode logic 514 may switch between the single threaded mode and the second mode by taking an interrupt. Taking the interrupt may cause the switching mode logic 514 to save a current return address in a processor status register (e.g., 516a) comprising a plurality of process status registers 516a-516n for all hardware threads of the plurality of hardware threads 502a-502n, halt all but one active hardware thread (e.g., 502a) of the plurality of hardware threads 502a-502n, and cause the active hardware thread (e.g., 502a) to start executing from an interrupt handler address of an interrupt handler 518.

The computer processor 500 may further include processing logic 520 that when executed in the single threaded mode calls all of the hardware threads of the plurality of hardware threads 502a-502n having instructions to execute to resume execution at a saved return address with a saved processor status. The processing logic 520 may be activated by executing an instruction designed to cause resumption of the second mode.

The computer processor 500 may further include processing logic 520 to examine and modify the state of inactive hardware threads while the state processor logic 504 is running in single threaded mode.

The computer processor 500 may further include privilege logic 522 to divide the common logic 508 and the replicated state of a hardware thread (e.g., 502a) into at least two groups of state, to determine a privilege level for the thread, wherein at least one of the groups of state is inaccessible at a first privilege level, and switch between privilege levels. The computer processor 500 may further include privilege logic 522 to divide the replicated state of a hardware thread (e.g., 502a) into at least two groups of state, to determine a privilege level for the thread, wherein at least one of the groups of state is inaccessible at a first privilege level, and switch between privilege levels.

A switch from a more restrictive privilege level to a less restrictive privilege level may be effected using an interrupt that simultaneously changes the privilege level and changes an execution point of the computer processor 500 to a predetermined location. A switch from a more restrictive privilege level to a less restrictive privilege level may occur by processing logic 520 to execute an instruction that simultaneously changes the privilege level and changes an execution point of the computer processor 500 to a predetermined location.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A processor running a plurality of operating systems supported by a hypervisor, comprising:
   a plurality of hardware threads;
   state processor registers for storing a state of a first hardware thread of the plurality of hardware threads, wherein the state processor registers comprise:
      per thread registers, designated to the first hardware thread, for storing the state that is replicated for the plurality of hardware threads, wherein the per thread registers comprise a first group of registers associated with a user privilege, a second group of registers associated with a super-user privilege, and a third group of registers associated with a hypervisor privilege; and
      common registers for storing information that is independent of a number of the plurality of hardware threads, wherein the common registers comprise a fourth group of registers associated with the super-user privilege and a fifth group of registers associated with the hypervisor privilege;
   a single threaded mode circuit to execute instructions, in a single threaded mode, from the first hardware thread of the plurality of hardware threads;

a second mode circuit to simultaneously execute instructions, in a second mode, from more than one hardware threads of the plurality of hardware threads;
a switching mode circuit to switch between the single threaded mode and the second mode; and
a privilege circuit to switch the first hardware thread running in the super-user privilege to the hypervisor privilege responsive to receiving an interrupt generated in the second mode directed to a device shared by the more than one hardware threads and determining that an interrupt handler needs to virtualize the generated interrupt.

2. The processor of claim 1, wherein the state processor registers are to permit a state common to all of the plurality of hardware threads accessible under the single threaded mode, and wherein each one of the plurality of operating systems supports the user privilege and the super-user privilege.

3. The processor of claim 1, wherein the switching mode circuit switches between the single threaded mode and the second mode by taking the interrupt.

4. The processor of claim 3, wherein taking the interrupt causes the switching mode circuit to:
save a current return address in a corresponding processor status register associated with each of the more than one hardware threads;
halt all but one active hardware thread of the plurality of hardware threads; and
cause the active hardware thread to start executing from an interrupt handler address.

5. The processor of claim 1, further comprising a processing circuit that, when the single threaded mode is switched to the second mode, causes each of the plurality of hardware threads having instructions to execute to resume execution at a corresponding saved return address with a saved processor status.

6. The processor of claim 5, wherein the processing circuit is activated by executing an instruction designed to cause resumption of the second mode.

7. The processor of claim 1, further comprising a processing circuit to examine and modify the state of inactive hardware threads while the processor is running under the single threaded mode.

8. The processor of claim 1, wherein the privilege circuit is to:
divide the common registers associated with the first hardware thread into at least two groups;
determine a privilege level for the first hardware thread, wherein at least one of the groups is inaccessible at a first privilege level of the user privilege or the super-user privilege; and
switch between the first privilege level and a second privilege level of the hypervisor privilege.

9. The processor of claim 8, wherein a switch from a more restrictive privilege level to a less restrictive privilege level is effected using an interrupt that simultaneously changes the privilege level and changes an execution point of the processor to a predetermined location.

10. The processor of claim 8, wherein a switch from a more restrictive privilege level to a less restrictive privilege level occurs by a processing circuit to execute an instruction that simultaneously changes the privilege level and changes an execution point of the processor to a predetermined location.

11. The processor of claim 1, wherein the privilege circuit is to:
divide the per thread registers associated with the first hardware thread into at least two groups;
determine a privilege level for the first hardware thread, wherein at least one of the groups is inaccessible at a first privilege level of the user privilege or the super-user privilege; and
switch between the first privilege level and a second privilege level of the hypervisor privilege.

12. A method comprising:
executing a hypervisor to support a plurality of operating systems;
storing, in state processor registers associated with a processor, a state of a first hardware thread of a plurality of hardware threads, wherein the state processor registers comprise:
per thread registers, designated to the first hardware thread, for storing the state that is replicated for the plurality of hardware threads, wherein the per thread registers comprise a first group of registers associated with a user privilege, a second group of registers associated with a super-user privilege, and a third group of registers associated with a hypervisor privilege; and
common registers for storing information that is independent of a number of the plurality of hardware threads, wherein the common registers comprise a fourth group of registers associated with the super-user privilege and a fifth group of registers associated with the hypervisor privilege;
executing, by a single threaded mode circuit, instructions from the first hardware thread of the plurality of hardware threads under a single threaded mode;
executing, by a second mode circuit, instructions from more than one hardware thread of the plurality of hardware threads simultaneously under a second mode;
switching, by a switching mode circuit, between the single threaded mode and the second mode, and
switching, by a privilege circuit, the hardware thread running in the super-user privilege to the hypervisor privilege responsive to receiving an interrupt generated in the second mode directed to a device shared by the more than one hardware threads and determining that an interrupt handler needs to virtualize the generated interrupt.

13. The method of claim 12, further comprising permitting, by the state processor registers, a state common to all of the plurality of hardware threads accessible under the single threaded mode, and wherein each one of the plurality of operating systems supports the user privilege and the super-user privilege.

14. The method of claim 12, further comprising switching, by the switching mode circuit, between the single threaded mode and the second mode by taking the interrupt.

15. The method of claim 14, wherein taking the interrupt causes the switching mode circuit to:
save a current return address in a corresponding processor status register associated with each of the more than one hardware threads;
halt all but one active hardware thread of the plurality of hardware threads; and
cause the active hardware thread to start executing from an interrupt handler address.

16. The method of claim 12, further comprising processing, by a processing circuit, an instruction that, when the single threaded mode is switched to the second mode, causes each of the plurality of hardware threads having instructions to execute to resume execution at a corresponding saved return address with a saved processor status.

17. The method of claim 12, further comprising examining and modifying, by a processing circuit, the state of inactive hardware threads while the processor is running under the single threaded mode.

18. The method of claim 12, further comprising:
dividing, by the privilege circuit, the common registers associated with the hardware thread into at least two groups;
determining a privilege level for the first hardware thread, wherein at least one of the groups is inaccessible at a first privilege level of the user privilege or the super-user privilege; and
switching between the first privilege level and a second privilege level of the hypervisor privilege.

19. The method of claim 12, further comprising:
dividing, by the privilege circuit, the per thread registers associated with the first hardware thread into at least two groups;
determining a privilege level for the first hardware thread, wherein at least one of the groups is inaccessible at a first privilege level of the user privilege or the super-user privilege; and
switching between the first privilege level and a second privilege level of the hypervisor privilege.

20. The method of claim 18, further comprising:
switching from a more restrictive privilege level to a less restrictive privilege level is effected using an interrupt that simultaneously changes the privilege level and changes an execution point of the processor to a predetermined location.

21. The method of claim 18, further comprising:
switching from a more restrictive privilege level to a less restrictive privilege level occurs by a processing circuit to execute an instruction that simultaneously changes the privilege level and changes an execution point of the processor to a predetermined location.

\* \* \* \* \*